Jan. 11, 1949.  B. HOPPE  2,458,907
SERVING COMBINATION
Filed Aug. 2, 1944  3 Sheets-Sheet 1

INVENTOR
Boris Hoppe
BY
ATTORNEYS

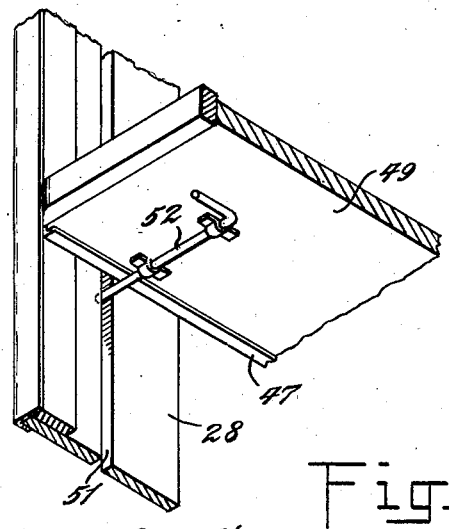
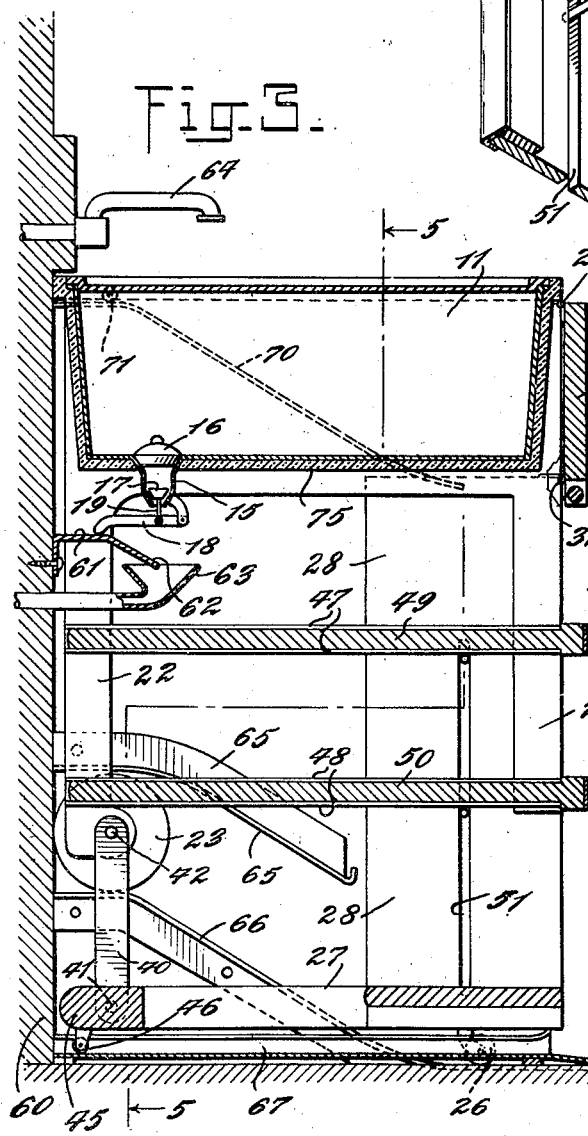
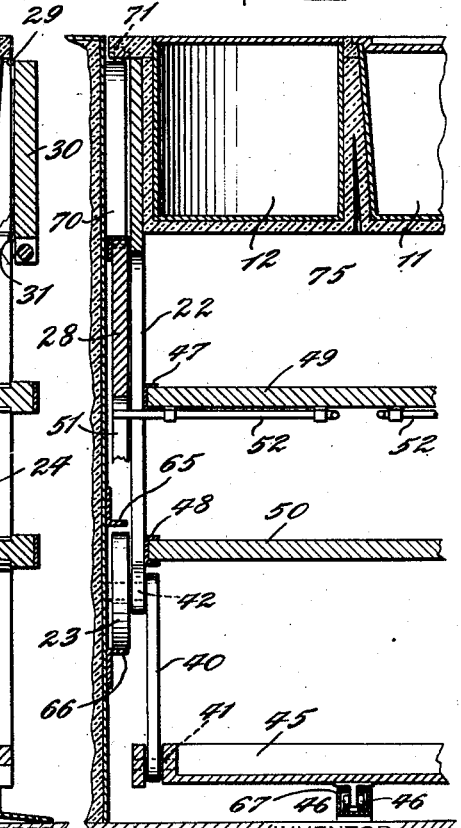

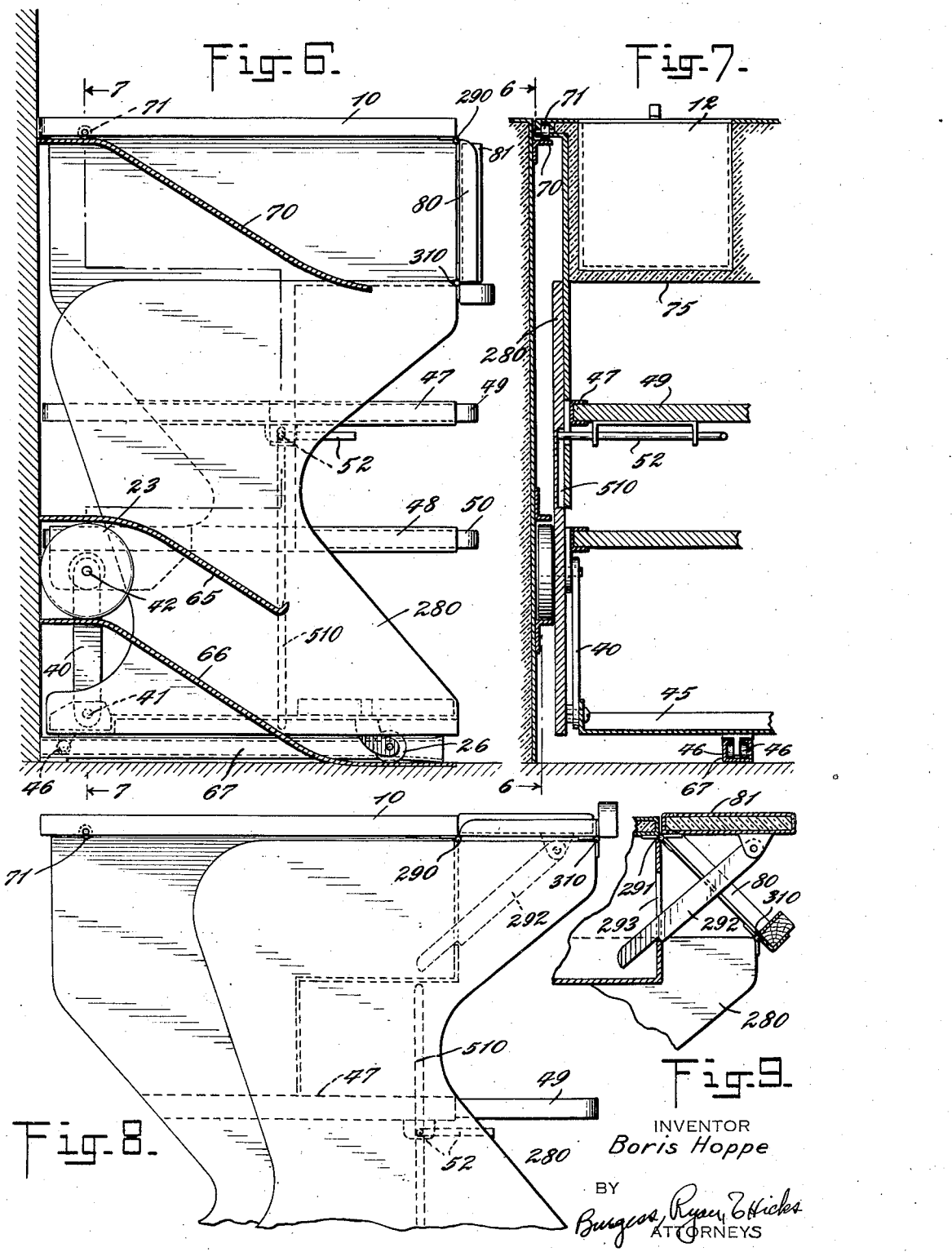

Patented Jan. 11, 1949

2,458,907

UNITED STATES PATENT OFFICE 2,458,907

SERVING COMBINATION

Boris Hoppe, Kew Gardens, N. Y.

Application August 2, 1944, Serial No. 547,735

8 Claims. (Cl. 280—44)

This invention relates to a serving combination having cooperating fixed and movable parts. It also relates to a server of unique design and exceptional utility.

The problems of a hostess in serving guests with food at a distance from the kitchen are not small. In general the problems are not solved except by the personal labor of the hostess or her servants, who must make frequent and time consuming trips to the kitchen to bring in the various dishes which constitute a meal.

The inconvenience attending service is considerable when the distance travelled is merely from a dining room to an adjacent kitchen, and it becomes very great when, as in a garden party, the food must be transported relatively long distances. It has been proposed in the past to serve from small wheeled tables, but such equipment is either too small to be a satisfactory solution to the various problems which arise, or of objectionable bulk. The servers of the prior art type have been a compromise between the needs of the kitchen and the needs of service at the table, being wholly satisfactory in neither use.

It is an object of this invention to make a server combination which does not occupy additional kitchen space, which is the right height for loading and the right height for serving, which takes food to the table hot or cold, as desired, which brings back used table ware concealed, the height of which is automatically adjusted to its needs, the shelves of which may be automatically aligned, and which is of such simple construction that it can be manufactured and sold at a reasonable price.

The objects of the invention are accomplished generally speaking by a server combination having fixed and movable parts, of which the fixed part forms a permanent kitchen installation and of which the movable part may be wheeled wherever service is desired.

Further objects of the invention are attained by providing the server with a top, and optionally with shelves, which is automatically raised and lowered by the fixed part of the combination so that it is of the correct height for loading and of the correct height for serving. Other objects of the invention are accomplished by providing the server with shelves which are automatically movable to give free access to shelves of different elevation. Other objects of the invention are accomplished by providing the server with insulated and covered compartments which may be provided with automatic drains. The method and means by which the foregoing and other objects are accomplished will be better understood from the details of the specification which follow.

In the drawings:

Fig. 3 is a side elevational view, partly in section showing the fixed and movable parts of the server combination in cooperating relation, the server top being in elevated position.

Fig. 4 is a fragment showing the shelf latch which controls the position of the shelves during the elevation and retraction of the server top.

Fig. 5 is a front elevational view partly in section of one side of the server.

Fig. 6 is a section on line 6—6 of Fig. 7.

Fig. 7 is a section on line 7—7 of Fig. 6.

Fig. 8 shows the server of Fig. 6 with top lowered.

Fig. 9 shows the top being raised and the shelf construction.

Figure 1:
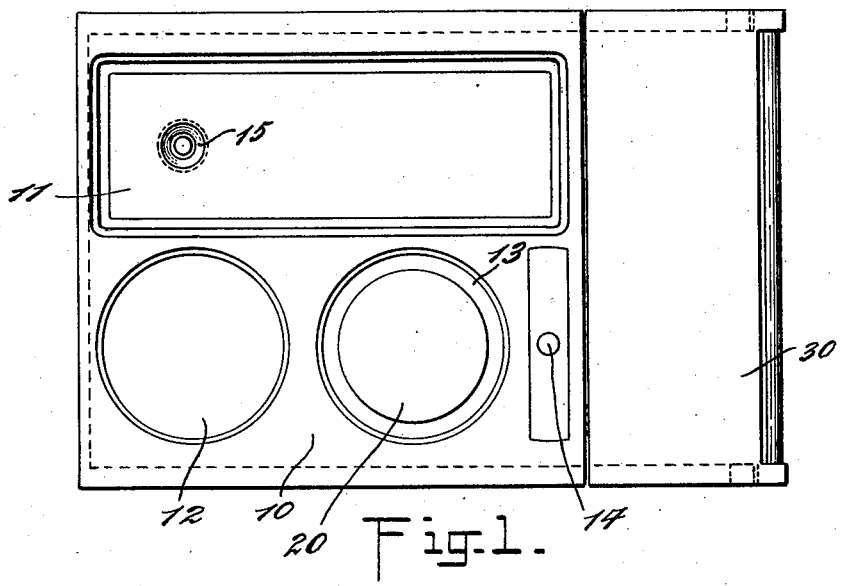
Fig. 1 is a plan view of a server constructed in accordance with the principles of my invention.

In the drawings 10 is a server top which may have the form of a flat table, but which is shown as provided with compartments 11, 12 and 13 which are illustrated as covered by insulation 75 to maintain the temperature of hot or cold food. Compartment 13 may have a heating element 20 operated by a switch 14 which may be connected to a source of current by a cord and plug 21. Compartment 11 and the other compartments may be water tight and may contain a drain such as 15, which has an inner stopper 16 and a valve 17 which is connected to a pivoted lever 18 by arm 19. This portion of the server has legs 22 which carry wheels 23 at their lower ends and legs 24 which help to carry the shelves and are themselves carried by the support 25 which has wheels 26, longitudinal members 27 and uprights 28. The member 10 rests at one end upon uprights 28 and is hinged at 29 to shelf 30 which is in turn hinged at 31 to the uprights 28.

Arms 40 are pivoted at 41 to longitudinal members 27 and at 42 to legs 22. On a cross member 45 between longitudinal members 27 is mounted a pair of retainer wheels 46.

U-shaped members 47, 48 brace the legs 22, 24 and form channels to receive slidable shelves 49 and 50. In the uprights 28 are slots 51. On the bottoms of the shelves are slidable pins 52 which, when in an extended position, engage the slots 51 and maintain the position of the shelves with relation to the uprights 28. By retracting the pin 52 a shelf can be fixed in its relation to the movable part of the server. By fixing one shelf with respect to the vertically movable section and the other with respect to the support of the server the shelf position shown in Fig. 2 may be attained, giving free access, from opposite ends of the server, to the greater portion of each shelf.

The fixed portion of the combination may form part of a stove, a work table, or any other item of fixed equipment, or it may be separately installed. As shown it is a three sided stall for the server. The rear wall is shown at 60 in the drawings, and is provided with a projecting element 61 having a cam surface 62 upon which the lever 18 rides to open the valve 17. Projecting from the wall 60 is a drain 63 which may be connected to the sewer. Also projecting from the wall is a faucet 64 which may be connected to hot and cold water and serves to supply these liquids to respective compartments of the server. On the side walls, upper and lower tracks 65 and 66 on each side of the fixed part of the combination engage the two wheels 23, as the server is pushed into place, and help to raise the entire movable section to the height of the adjacent stove top or other working surface. The retainer wheels 46 are caught in a pair of enclosed tracks 67 and prevent the movable section from tilting the support. Tracks 70 on opposite sides of the fixed part of the combination receive rollers 71 at the rear edge of the top and also help to raise the movable section.

The invention operates as follows: with the movable section in raised position, the top thereof is level with and provides an additional working surface adjacent the stove or other working surface. In this position the covers of the compartments 11, 12 and 13 can be removed and the compartments filled with food stuffs. The shelves may be filled with plates and food stuffs which do not require maintenance of temperature; in short, the entire service for a meal may be put on the server at once so that only one trip to the dining room or to the point of service will be required. When the server is loaded the lower end of the depending shelf 30 is grasped and pulled. A comparatively slight pull is sufficient to draw the server away from the fixed part of the combination. As the server is drawn forward the track 65 over the upper parts of the wheels tends to throw the wheels 23 backward and down while at the same time the retainer wheels 46 and the wheels 23 support the weight of the rear end of the server. The vertically movable section of the server pivots about the shelf 30 and the arms 40 and assumes the position shown in Fig. 2 at which its height has been reduced from that of a stove to the ideal height for serving at table, and the size of its top has been materially and beneficially increased. In this condition the server is supported entirely by wheels 23 and 26 and may be wheeled with a minimum of effort to the point of service.

Figure 2:
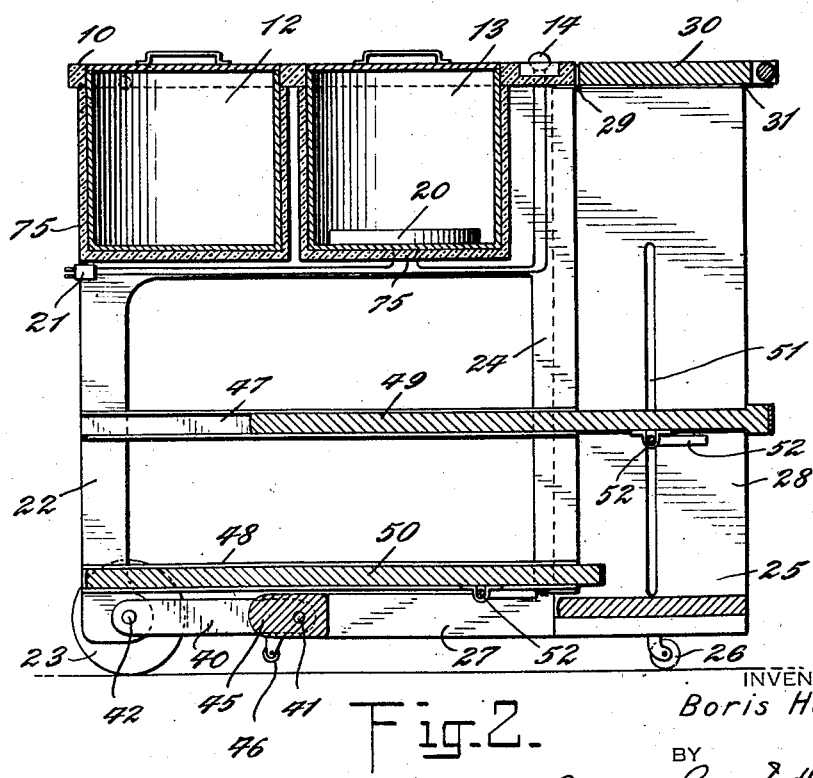
Fig. 2 is a side elevational view partly in section of the server shown in Fig. 1 with the top in lowered position.

If it is desired, the latch 52 on the upper shelf may be positioned in slot 51 of the uprights 28 so that the shelf assumes the position shown in Fig. 2 when the vertically movable section is lowered. The lower shelf 50 may be fixed with respect to either the movable or the supporting section as desired. Maximum access to the shelves is had when they are displaced with respect to each other, as shown in Fig. 2.

When the server is moved away from its cooperating fixed part the lever 18 slides down the cam 62, seating the valve 17. This furnishes a double seal for the compartment. This compartment may be partly filled with hot water, or with a cooling medium in order to maintain the temperature of food or drinks therein, or to receive used dishes at the end of the meal. The valve and stopper form a double seal which cannot be carelessly opened by the removal of the stopper. The position of the lever 18 is out of the way and in normal circumstances, the lever would not be observed or tampered with.

On its return to the kitchen, service pantry, or the point where the cooperating fixed part of the combination is located, the wheels 23 of the server are aligned with the tracks and a very moderate push will elevate the vertically movable section to its raised position. At the same time the valve 18 is opened and the compartments are placed beneath faucet 64. The dishes may be washed in the large compartment, if desired, and the entire apparatus cleaned and made ready for its next use. In that position it forms part of the stove top or of a work table.

In Figs. 6, 7, 8 and 9 are shown modifications of my invention. In these figures the curved uprights 280 replace the legs 22 and uprights 28 of the form of the invention first disclosed, and provide better access to the shelves; the grooves 510 on the inside of the uprights 280 replace the slots 51, and the top is hinged at the front to angle-irons 80 by hinges 290 and 310. The shelf 81 is pivoted to the top by hinges 291 (Fig. 9) and is supported in its raised position by notched bar 292 which slides in a hole 293 in the front of the server between the compartments. This construction gives freer access to the shelves and prevents unintentional dumping of the pivoted shelf.

Among the numerous advantages of my invention are the provision of a server combination having automatic features which render it ideal for home or for restaurant use. Another advantage of the invention is a server having automatically adjusted height that makes it ideal for loading, for use as a work table, and for serving. Another advantage of the invention is the arrangement by which easy access to the shelves is provided.

As many apparently widely different embodiments of this invention may be made without departing from the spirit and scope thereof, it is to be understood that I do not limit myself to the specific embodiments thereof except as defined in the appended claims.

I claim:

1. In a device of the character described, the combination of a movable server having a section thereof adapted to be moved vertically with respect to said server, said section comprising a top portion and legs supporting said top portion; vertically disposed support members swingably attached to said top portion and adapted to be swung from a first position at one side of said top portion to a second position underneath said top portion; means pivotally connecting said support members with a pair of said legs, said pivotal connecting means being operative in response to a force acting thereon to exert pressure on said section while coincidently permitting movement of said support members from said first position to said second position, and means cooperative with said pivotal connecting means for directing the pressure on said section upwardly in order to raise said section.

2. In a serving combination comprising a movable server, the combination of a top portion having compartments therein and legs supporting said top portion, one pair of legs having wheels secured thereto; said server having support members disposed adjacent one side of said top portion and movable relatively to the top portion; link means pivotally secured to said support members and to said wheels; means responsive to a moving force acting on the server for directing through said link means at least a portion of said force against said wheels to move said top portion in a generally upward direction; and means for restraining said support members to permit said top portion to move upwardly relatively thereto.

3. In a server having a top portion and supporting legs therefor, the combination of vertically disposed support members movably secured to said top portion; said top portion and legs comprising a vertically movable section of said server; means pivotally connecting said support members with said legs and operative to swing upwardly at the leg connection in response to force applied thereto in a direction substantially towards said top portion; and means for directing a force against said pivotal connecting means in said direction in order to elevate said movable section; said support members being movable from a position at one side of said top portion to a position below said top portion coincidently with the elevating of said movable section.

4. A serving combination comprising stationary inclined tracks and a movable server having a section thereof adapted to be moved vertically with respect to said server, said section comprising a top portion and legs supporting said top portion; wheels on a pair of said legs adapted to traverse said tracks; vertically disposed support members swingably attached to said top portion and, through link members, to said pair of legs and adapted to be swung relative to the top portion in response to movement of said wheels along said inclined tracks.

5. A serving combination comprising a stationary part and a movable server adapted to be attached to and detached from said stationary part; said stationary part having outwardly extending inclined tracks; said server having a top portion and vertically disposed support members adapted to be swung from one side of said top portion to a position underneath said top portion; wheels on the server connected to said top portion and adapted to traverse said tracks; and means pivotally connecting the support members with said wheels and adapted to swing during passage of said wheels along said inclined tracks.

6. A serving combination comprising a stationary wall part and a movable server adapted to be attached to and detached from said wall part; said server having a section thereof adapted to be moved vertically upwardly to a loading position as the server is being attached to the wall part, said section comprising a top portion and legs supporting said top portion; said server having a shelf hinged to said top portion; vertically disposed support members swingably attached to said shelf and to a pair of said legs and adapted to be swung underneath said top portion as the server is being attached to the wall part; and means for attaching the server to the wall part.

7. A serving combination comprising a stationary part and a movable server adapted to be attached to and detached from said stationary part; said stationary part having outwardly extending inclined tracks; said server having a section thereof adapted to be moved vertically upwardly as the server is being attached to the wall part, said section comprising a top portion and legs supporting said top portion; said server having vertically disposed support members adapted to be swung from one side of said top portion to a position underneath said top portion; means pivotally connecting the support members with said legs and adapted to thrust upwardly on said legs as said support members are swung underneath said top portion; and means on said server for traversing said tracks and coincidently thereto elevating said section.

8. In a server having a top portion and supporting uprights therefor, the combination of a shelf member swingably attached to said top portion and to said uprights; said top portion and uprights comprising a vertically movable section of said server; wheels on said server adapted to rest on the floor; means for pivotally securing said uprights to said wheels; said uprights being adapted to be swung from a position level with said top portion to a position below said top portion, and said wheels being adapted to be swung, coincidently with the movement of the uprights, from a position on the floor to a position above the floor, whereby said movable section is adapted to be raised to a height greater than its previous height.

BORIS HOPPE.

REFERENCES CITED

The following references are of record in the file of this patent:

UNITED STATES PATENTS

| Number | Name | Date |
|---|---|---|
| 356,938 | Hayward | Feb. 1, 1887 |
| 490,127 | Sigafoos | Jan. 17, 1893 |
| 956,619 | Bennett | May 3, 1910 |
| 1,107,678 | Loudon | Aug. 18, 1914 |
| 1,170,712 | Trombley | Feb. 8, 1916 |
| 1,256,211 | Dempsey et al. | Feb. 12, 1918 |
| 1,298,185 | Dodson | Mar. 25, 1919 |
| 1,483,850 | Kaufman | Feb. 12, 1924 |
| 1,582,806 | Videtta | Apr. 27, 1926 |
| 1,924,505 | Long | Aug. 29, 1933 |
| 2,094,522 | Blake | Sept. 28, 1937 |
| 2,319,581 | Brownlee et al. | May 18, 1943 |

FOREIGN PATENTS

| Number | Country | Date |
|---|---|---|
| 91,917 | Germany | Aug. 18, 1896 |
| 470,960 | France | June 29, 1914 |